(12) United States Patent
Oh et al.

(10) Patent No.: US 9,300,148 B2
(45) Date of Patent: Mar. 29, 2016

(54) APPARATUS FOR CHARGING BOTH MAIN BATTERY AND AUXILIARY BATTERY USING THE SAME PRIMARY WINDING AND TWO DIFFERENT SECONDARY WINDINGS OF SINGLE TRANSFORMER

(75) Inventors: Sung Min Oh, Gyeonggi-do (KR); Tae Kyung Moon, Seoul (KR); Hyung Tae Moon, Seoul (KR); Sun Min Hwang, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 937 days.

(21) Appl. No.: 13/423,974

(22) Filed: Mar. 19, 2012

(65) Prior Publication Data
US 2012/0235626 A1 Sep. 20, 2012

(30) Foreign Application Priority Data

Mar. 18, 2011 (KR) ........................ 10-2011-0024454

(51) Int. Cl.
*H02J 7/00* (2006.01)
*B60L 11/18* (2006.01)
(Continued)

(52) U.S. Cl.
CPC ........... *H02J 7/0022* (2013.01); *B60L 11/1812* (2013.01); *H02J 7/0013* (2013.01);
(Continued)

(58) Field of Classification Search
CPC ..... H02J 7/0054; H02J 7/0052; H02J 7/0055; H02J 2007/0059; H02J 7/0065; H02J 7/02; H02J 7/0068; Y02E 60/128
USPC .......... 320/107, 109, 103, 104, 128, 138, 137
See application file for complete search history.

(56) References Cited

U.S. PATENT DOCUMENTS 3,305,754 A * 2/1967 Oaks et al. ..................... 320/116
3,886,426 A * 5/1975 Daggett ......................... 320/117
(Continued)

FOREIGN PATENT DOCUMENTS

EG  WO 2009097864 A1 * 8/2009 .......... H01M 6/5033
JP  11178228 A    7/1999
(Continued)

OTHER PUBLICATIONS

Chen et al ("Space Vector Modulation Control of an AC-DC-AC Converter With a Front-End Diode Rectifier and Reduced DC-link Capacitor", IEEE Transactions on Power Electronics, vol. 21, 5, Sep. 2006).*

(Continued)

*Primary Examiner* — Drew A Dunn
*Assistant Examiner* — John Trischler
(74) *Attorney, Agent, or Firm* — McDermott Will & Emery LLP

(57) ABSTRACT

A battery charging apparatus includes a converting unit, first and second charging units and a switching unit. The converting unit separately convert AC power into a first voltage and a second voltage. The first charging unit drops the converted first voltage and charge a high voltage battery with the dropped first voltage. The second charging unit drops the converted second voltage or a third voltage of the high voltage battery, and charges an auxiliary battery with the dropped second or third voltage. The switching unit performs, in a first mode, the charging of the high voltage battery and the auxiliary battery by the AC power, and in a second mode, stops the charging of the high voltage battery by the AC power and performs the charging of the auxiliary battery by the third voltage.

7 Claims, 5 Drawing Sheets

(51) Int. Cl.
*H01F 38/14* (2006.01)
*H02J 17/00* (2006.01)
*H02J 7/02* (2006.01)
*H02J 7/10* (2006.01)
*H02M 3/335* (2006.01)
*H02M 1/00* (2007.01)

(52) U.S. Cl.
CPC ........ *H02M3/3353* (2013.01); *H02M 3/33561* (2013.01); *H02M 3/33592* (2013.01); *B60L 11/1868* (2013.01); *H02M 2001/008* (2013.01); *Y02B 70/1475* (2013.01); *Y02T 10/7055* (2013.01); *Y02T 10/7066* (2013.01); *Y02T 90/127* (2013.01)

(56) References Cited

U.S. PATENT DOCUMENTS

| | | | | |
|---|---|---|---|---|
| 3,900,784 | A * | 8/1975 | Seike | 320/123 |
| 4,084,124 | A * | 4/1978 | Kapustka | 320/131 |
| 4,331,911 | A * | 5/1982 | Park | 320/119 |
| 4,670,703 | A * | 6/1987 | Williams | 320/125 |
| 5,003,244 | A * | 3/1991 | Davis, Jr. | 320/119 |
| 5,006,782 | A * | 4/1991 | Pelly | 323/225 |
| 5,391,973 | A * | 2/1995 | Tomazic | 320/120 |
| 5,633,577 | A * | 5/1997 | Matsumae et al. | 322/37 |
| 5,659,237 | A * | 8/1997 | Divan et al. | 320/119 |
| 5,666,041 | A * | 9/1997 | Stuart et al. | 320/116 |
| 5,793,189 | A * | 8/1998 | Kawaguchi et al. | 322/28 |
| 5,814,970 | A * | 9/1998 | Schmidt | 320/118 |
| 5,869,950 | A * | 2/1999 | Hoffman et al. | 320/103 |
| 5,982,143 | A * | 11/1999 | Stuart | 320/119 |
| 6,087,802 | A * | 7/2000 | James | 320/104 |
| 6,100,663 | A * | 8/2000 | Boys et al. | 320/108 |
| 6,204,630 | B1 * | 3/2001 | James | 320/104 |
| 6,297,616 | B1 * | 10/2001 | Kubo et al. | 320/116 |
| 6,586,909 | B1 * | 7/2003 | Trepka | 320/108 |
| 6,794,846 | B2 * | 9/2004 | Tsuji | 320/103 |
| 6,923,279 | B2 * | 8/2005 | Shimane et al. | 180/65.1 |
| 6,924,567 | B2 * | 8/2005 | Killian et al. | 307/46 |
| 6,956,353 | B1 * | 10/2005 | Klitzner | 320/107 |
| 7,245,108 | B2 * | 7/2007 | Chertok et al. | 320/132 |
| 7,301,308 | B2 * | 11/2007 | Aker et al. | 320/139 |
| 7,378,818 | B2 * | 5/2008 | Fowler et al. | 320/119 |
| 7,506,182 | B2 * | 3/2009 | Taniguchi et al. | 713/300 |
| 7,839,116 | B2 * | 11/2010 | Esaka et al. | 320/103 |
| 8,030,882 | B2 * | 10/2011 | Ito et al. | 320/104 |
| 8,307,930 | B2 * | 11/2012 | Sailor et al. | 180/65.29 |
| 8,682,517 | B2 * | 3/2014 | Iida | 701/22 |
| 8,692,507 | B2 * | 4/2014 | Chen | 320/103 |
| 8,692,512 | B2 * | 4/2014 | Tanikawa et al. | 320/109 |
| 2001/0024102 | A1 * | 9/2001 | Egami | 318/801 |
| 2001/0041952 | A1 * | 11/2001 | Nada | 701/22 |
| 2003/0090235 | A1 * | 5/2003 | Tsuji | 320/128 |
| 2004/0135544 | A1 * | 7/2004 | King et al. | 320/116 |
| 2006/0232238 | A1 * | 10/2006 | Horii | 320/104 |
| 2008/0084185 | A1 * | 4/2008 | Nakazawa | 320/128 |
| 2008/0084714 | A1 * | 4/2008 | Kawasaki et al. | 363/21.01 |
| 2008/0101096 | A1 * | 5/2008 | Takayanagi et al. | 363/17 |
| 2008/0316774 | A1 * | 12/2008 | Ito et al. | 363/17 |
| 2009/0103341 | A1 * | 4/2009 | Lee et al. | 363/124 |
| 2011/0168462 | A1 * | 7/2011 | Stanek et al. | 180/65.1 |
| 2011/0169448 | A1 * | 7/2011 | Ichikawa | 320/109 |
| 2012/0022738 | A1 * | 1/2012 | Kato et al. | 701/22 |
| 2012/0169281 | A1 * | 7/2012 | Itagaki et al. | 320/109 |
| 2012/0249058 | A1 * | 10/2012 | Kuraishi | 320/107 |

FOREIGN PATENT DOCUMENTS

| | | | | |
|---|---|---|---|---|
| JP | WO 2010082275 | A1 * | 7/2010 | H02M 1/10 |
| WO | WO 2010082275 | A1 * | 7/2010 | |
| WO | WO 2013015273 | A1 * | 1/2013 | |

OTHER PUBLICATIONS

Ho et. Al ("Optimising single-phase PFC pre-staged AC/DC/AC topology via common-neutral connection", Electronic Letters, Aug. 15, 1996, vol. 32, Issue 17.*
Endo et al. ("A High Power Factor Buck Converter", IEEE 1992).*
Billings ("Advantages of Interleaving Converters", Power Electronics, 2003).*
Foutz, "Switching-Mode Power Supply Design Tutorial Simple Switching Topologies: Buck Converter," SMPS Technology, Published Dec. 17, 2009, Accessed Apr. 8 2015, http://web.archive.org/web/20091217165633/http://www.smpstech.com/tutorial/t03top.htm.*
Chinese Office Action issued in Chinese Application No. 201210073128.1 dated Feb. 8, 2014.

* cited by examiner

APPARATUS FOR CHARGING BOTH MAIN BATTERY AND AUXILIARY BATTERY USING THE SAME PRIMARY WINDING AND TWO DIFFERENT SECONDARY WINDINGS OF SINGLE TRANSFORMER

CROSS-REFERENCE(S) TO RELATED APPLICATION

This application claims priority of Korean Patent Application No. 10-2011-24454, filed on 2011.03.18, in the Korean Intellectual Property Office, which is hereby incorporated by reference in its entirety.

BACKGROUND OF THE INVENTION

1. Field of the Invention

The present invention relates to a battery charging apparatus, and more particularly, to a battery charging apparatus that commonly uses a power conversion structure in an on board charger (OBC) so that an auxiliary battery is also charged by AC power when a high voltage battery is charged by the AC power.

2. Description of the Related Art

Due to problems such as global warming caused by environmental destruction, high oil prices, and the like, the development of electric vehicles has recently been rapidly progressing in the automobile industry. Currently, major automobile manufactures around the world are conducting research and development to manufacture electric vehicles as their main vehicles.

Electric vehicles emit no exhaust gas and make a very small noise. Electric vehicles were manufactured earlier than gasoline vehicles in 1873. However, due to heavy batteries and long charging time, electric vehicles have not been put to practical use. Meanwhile, as pollution problems have become serious in recent years, electric vehicles are being developed again. However, since the number of times of use of rechargeable batteries is limited, the use of batteries alone cannot ensure a long distance drive.

Therefore, in the current markets, hybrid vehicles using two types of power sources, such as a fossil fuel and a battery, are actively on sale in the North America. Prius manufactured by Toyota Motor Corporation of Japan is a representative hybrid vehicle. Prius includes a gasoline engine, an alternator capable of converting kinetic energy recovered during the braking of a vehicle into electrical energy, and a motor.

Meanwhile, in the case of electric vehicles, methods of using a rechargeable battery (that is, an improvement in the performance of a secondary battery), a fuel cell having different characteristics from an existing cell, and the like, has been provided. Accordingly, the existing problems caused by a battery charging and a frequent replacement cycle in the electric vehicles have been gradually solved.

In the case of some small electric vehicles, not electric vehicles for general road drive, electric vehicles were already commercialized and are now widely used. For example, electric vehicles are widely used for golf carts in golf courses, vehicles for transporting players and equipments in stadiums, indoor drive vehicles, indoor cleaning vehicles, and the like, and it is expected that electric vehicles will be rapidly distributed and applied to commercial vehicles and sedans.

Electric vehicles and hybrid vehicles charges a high voltage battery mounted thereon and uses the high voltage battery as a power source. Vehicles are equipped with a high voltage battery for drive power, and an auxiliary battery for operating an electronic control unit (ECU).

As illustrated in FIG. 1, a conventional battery charging apparatus 1 includes an AC power 11, an on board charger (OBC) 12, an auxiliary battery 13, a high voltage battery 14, and a low voltage DC-DC converter (LDC) 15.

In order to charge the high voltage battery 14, the OBC 12 requires a high voltage charging unit 121 configured to convert the commercial AC power 11 into a high voltage.

However, the conventional battery charging apparatus 1 is designed to charge the high voltage battery 14 alone and consume the auxiliary battery 13 if an ECU using an ignition (IGN) power is operated during the charging.

Therefore, if the voltage of the auxiliary battery 13 is lowered, the battery charging apparatus 1 needs to operate the LDC 15 to charge the auxiliary battery 13. Also, since it is difficult to determine whether the auxiliary battery 13 needs to be charged, an efficient voltage management of the auxiliary battery 13 is difficult.

Moreover, since the LDC 15 charges the auxiliary battery 13 with an auxiliary voltage through a process of converting a high voltage into a low voltage in the high voltage battery 14, the high voltage of the high voltage battery 14 is consumed. Therefore, the number of times of charging/discharging of the high voltage battery 14 is increased, shortening the lifespan of the high voltage battery 14.

SUMMARY OF THE INVENTION

An aspect of the present invention is directed to a battery charging apparatus that is capable of charging both a high voltage battery and an auxiliary battery with a single AC power by commonly using a power conversion structure in an OBC.

According to an embodiment of the present invention, a battery charging apparatus includes: a hybrid power converting unit configured to use a common transformer to separately convert AC power into a first voltage and a second voltage for charging a high voltage battery and an auxiliary battery; a high voltage charging unit configured to drop the first voltage output from the hybrid power converting unit and charge the high voltage battery with the dropped first voltage; an auxiliary voltage charging unit configured to drop the second voltage output from the hybrid power converting unit or a voltage of the high voltage battery, and charge the auxiliary battery with the dropped second voltage or the dropped voltage of the high voltage battery; and a switching unit configured to switch an electrical connection between the AC power and the auxiliary voltage charging unit and switch an electrical connection between the high voltage battery and the auxiliary voltage charging unit, such that the second voltage generated by the conversion of the AC power or the voltage of the high voltage battery is selectively input to the auxiliary voltage charging unit, wherein, in a first mode, the charging of the high voltage battery and the charging of the auxiliary battery by the AC power are performed by the switching operation of the switching unit, and in a second mode, the charging of the high voltage battery by the AC power is stopped and the charging of the auxiliary battery by the voltage of the high voltage battery is performed by the switching operation of the switching unit.

The hybrid power converting unit, the high voltage charging unit, the auxiliary voltage charging unit, and the switching unit may be mounted on an on board charger (OBC).

The transformer may include a primary winding and secondary windings having different turns ratios for the power conversion into the first voltage and the second voltage.

In the second mode, the switching unit may perform a switching operation to transfer the voltage of the high voltage battery to an input terminal of a primary winding of the transformer, such that the auxiliary voltage charging unit charges the auxiliary battery with the voltage of the high voltage battery.

In the second mode, the switching unit may perform a switch operation to transfer the voltage of the high voltage battery to secondary windings of the transformer, such that the auxiliary voltage charging unit charges the auxiliary battery with the voltage of the high voltage battery.

The switching unit may include a first switching unit configured to switch the supply or interrupt of the AC power, and a second switching unit configured to switch the transfer of the voltage of the high voltage battery to the auxiliary voltage charging unit. In the first mode, the first switching unit may be switched to an ON state and the second switching unit may be switched to an OFF state. In the second mode, the first switching unit may be switched to an OFF state and the second switching unit may be switched to an ON state.

The transformer may include a primary winding and secondary windings having different turns ratios for the power conversion into the first voltage and the second voltage. The second switching unit may transfer the voltage of the high voltage battery to an input terminal of the primary winding of the transformer.

The second switching unit may be installed between both terminals of the high voltage battery and both input terminals of the primary winding of the transformer.

The transformer may include a primary winding and second windings having different turns ratios for the power conversion of the first voltage and the second voltage. The second switching unit is installed to transfer the voltage of the high voltage battery to a secondary winding connected to the high voltage charging unit among the secondary windings of the transformer.

The second switching unit may include a diode connected in a forward direction between a positive terminal of the high voltage battery and a secondary winding connected to the high voltage charging unit among the secondary windings of the transformer.

The battery charging apparatus may further include: a rectifying unit configured to perform a rectification operation to convert the AC power into a DC voltage; and a power factor correction (PFC) circuit configured to correct a power factor of the DC voltage and transfer the power-factor-corrected DC voltage to the hybrid power converting unit.

The high voltage charging unit and the auxiliary voltage charging unit may include interleaved buck converters.

<DESCRIPTION OF REFERENCE NUMERALS>

| | |
|---|---|
| 2: battery charging apparatus | 21: AC power |
| 22: OBC | 221: hybrid power converting unit |
| 222: high voltage charging unit | 223: auxiliary voltage |
| 224: switching unit | 225: rectifying unit |
| 226: PFC circuit | 23: auxiliary battery |
| 24: high voltage battery | |

DETAILED DESCRIPTION OF EXEMPLARY EMBODIMENTS

Exemplary embodiments of the present invention will be described below in detail with reference to the accompanying drawings.

Figure 1:
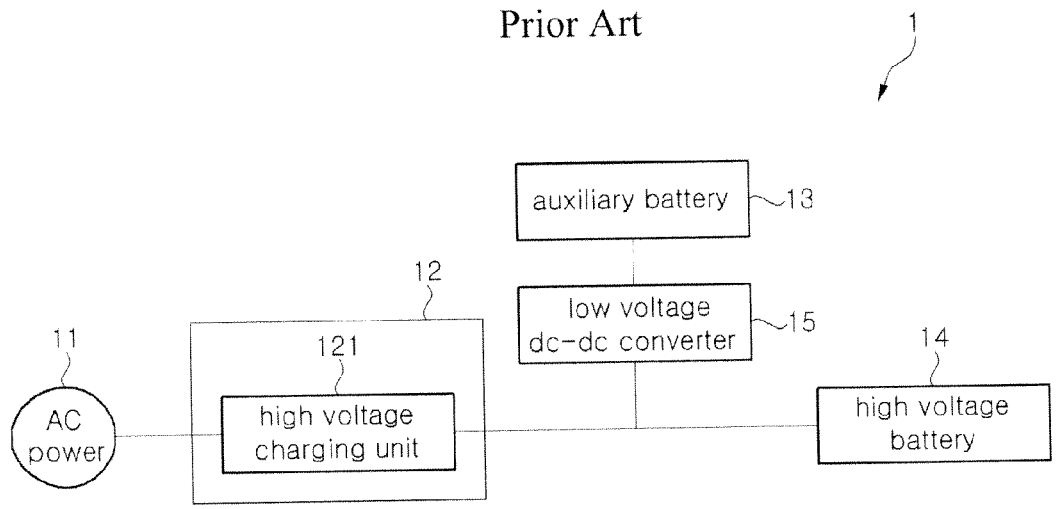
FIG. 1 is a block diagram of a conventional battery charging apparatus.
Figure 2:
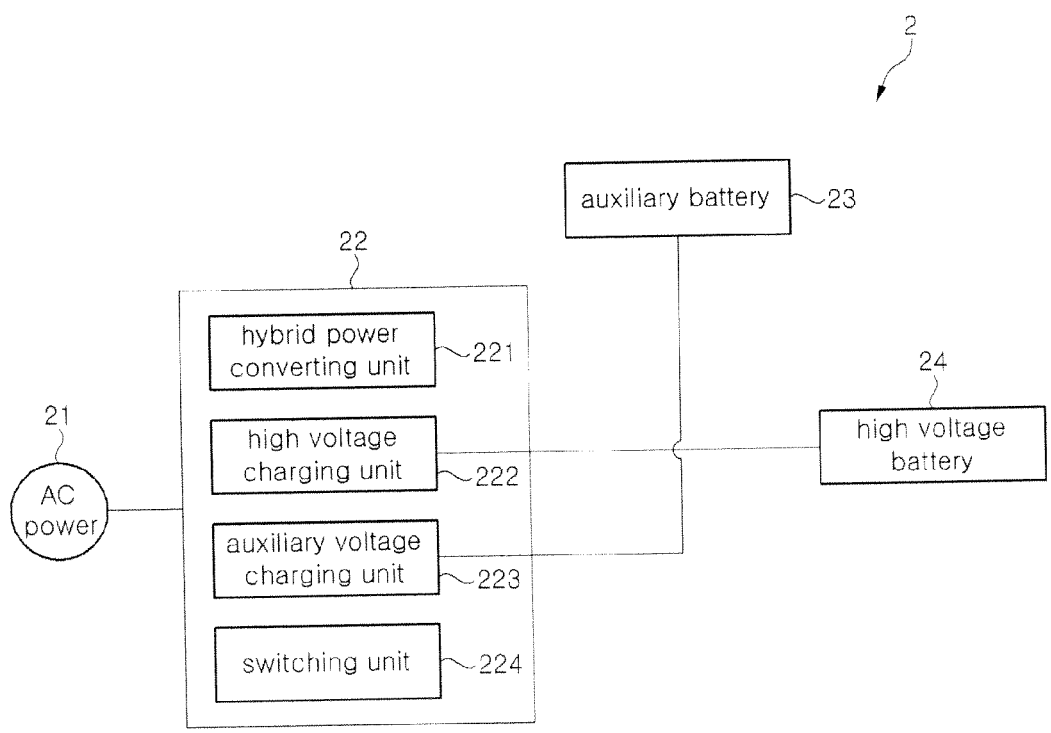
FIG. 2 is a block diagram of a battery charging apparatus according to an embodiment of the present invention.

FIG. 2 is a block diagram of a battery charging apparatus according to an embodiment of the present invention.

Referring to FIG. 2, a battery charging apparatus 2 according to an embodiment of the present invention may be installed in an electric vehicle (EV) or a plug-in hybrid electric vehicle (PHEV). The battery charging apparatus 2 may convert an AC power (110V/220V) 21 into a high voltage and charge a high voltage battery 24 with the high voltage, and may convert the AC power 21 into an auxiliary voltage and charge an auxiliary battery 23 with the auxiliary voltage. The high voltage battery 24 charged in this manner may be used as a power source of the EV or the PHEV, and the auxiliary battery 23 may be used to drive a variety of ECUs installed in the vehicle, for example, an ECU of a braking system, an ECU of a suspension system, an ECU of a steering system, and the like.

The battery charging apparatus 2 includes the AC power 21, the OBC 22, the auxiliary battery 23, and the high voltage battery 24.

Meanwhile, the components of the battery charging apparatus 2 may be integrally formed. Therefore, the battery charging apparatus 2 is easily mounted on the EV or the PHEV driven by electrical energy.

The OBC 22 may include a hybrid power converting unit 221, a high voltage charging unit 222, an auxiliary voltage charging unit 223, and a switching unit 224.

The hybrid power converting unit 221, the high voltage charging unit 222, the auxiliary voltage charging unit 223, and the switching unit 224 may be mounted on the OBC 22.

The hybrid power converting unit 221 includes a common transformer. The hybrid power converting unit 221 separately converts the AC power 21 into a first voltage and a second voltage for charging the high voltage battery 24 and the auxiliary battery 23 by using the transformer according to a charging instruction received from a battery management system (BMS) installed in the vehicle. The transformer is commonly used for the power conversion into the first voltage and the second voltage for the high voltage charging unit 222 and the auxiliary voltage charging unit 223. The transformer has secondary windings having turns ratios corresponding to the power conversion for the high voltage charging unit 222 and the auxiliary voltage charging unit 223.

The high voltage charging unit 222 drops the first voltage output from the hybrid power converting unit 221 according to the charging instruction received from the BMS installed in the vehicle, and charges the high voltage battery 24 with the dropped first voltage.

The auxiliary voltage charging unit 223 drops the second voltage output from the hybrid power converting unit 221 and charges the auxiliary battery 23 with the dropped second voltage.

The switching unit 224 switches an electrical connection between the AC power 21 and the auxiliary voltage charging unit 223 and switches an electrical connection between the high voltage battery 24 and the auxiliary voltage charging unit 223, such that the second voltage output from the hybrid power converting unit 221 or the voltage of the high voltage battery 24 is selectively input to the auxiliary voltage charging unit 223.

The switching unit 224 may perform a switching operation for a first mode and a second mode. The first mode is an AC power charging mode, in which the AC power 21 is supplied, the high voltage battery 24 is charged by the AC power 21, and the auxiliary battery 23 is supplementarily charged. The second mode is an AC power non-charging mode, in which the AC power 21 is not supplied and the auxiliary battery 23 is charged by the voltage of the high voltage battery 24 when the auxiliary battery 23 needs to be charged.

In the first mode, the switching unit 224 may perform a switching operation such that the charging of the high voltage battery 24 and the charging of the auxiliary battery 23 by the AC power 21 are performed. In the second mode, the switching unit 224 may perform a switching operation such that the charging of the high voltage battery 24 by the AC power 21 is stopped and the charging of the auxiliary battery 23 by the voltage of the high voltage battery 24 is performed.

The switching unit 224 may include a first switching unit configured to switch the supply or interrupt of the AC power 21, and a second switching unit configured to switch the voltage of the high voltage battery 24. In the first mode, the first switching unit is switched to an ON state and the second switching unit is switched to an OFF state. On the other hand, in the second mode, the first switching unit may be switched to an OFF state and the second switching unit may be switched to an ON state.

The operation of charging the high voltage battery 24 and the auxiliary battery 23 by the AC power 21 will be described below.

The OBC 22 receives an instruction to charge the high voltage battery 24 and the auxiliary battery 23 from the BMS (not illustrated). Accordingly, the switching unit 224 performs a switching operation such that the AC power 21 is input to the hybrid power converting unit 221. Then, the OBC 22 converts the AC power 21 into the first voltage through the hybrid power converting unit 221 and outputs the first voltage to the high voltage charging unit 222. The high voltage charging unit 222 drops the first voltage and charges the high voltage battery 24 with the dropped first voltage. Meanwhile, the OBC 22 converts the AC power 21 into the second voltage through the hybrid power converting unit 221 and outputs the second voltage to the auxiliary voltage charging unit 223. The auxiliary voltage charging unit 223 drops the second voltage and charges the auxiliary battery 23 with the dropped second voltage.

Meanwhile, the operation of charging the auxiliary battery 23 by the high voltage battery 24 will be described below.

The OBC 22 receives an instruction to charge the auxiliary battery 23 from the BMS (not illustrated). Accordingly, the switching unit 224 performs a switching operation such that the AC power 21 is not input to the high voltage charging unit 222 and the auxiliary voltage charging unit 223, and the power of the high voltage battery 24 is input to the auxiliary voltage charging unit 223.

Accordingly, the OBC 22 supplies the power of the high voltage battery 24 to the auxiliary voltage charging unit 223 through the secondary winding of the transformer. The auxiliary voltage charging unit 223 drops the power of the high voltage battery 24 and charges the auxiliary battery 23.

Figure 3:
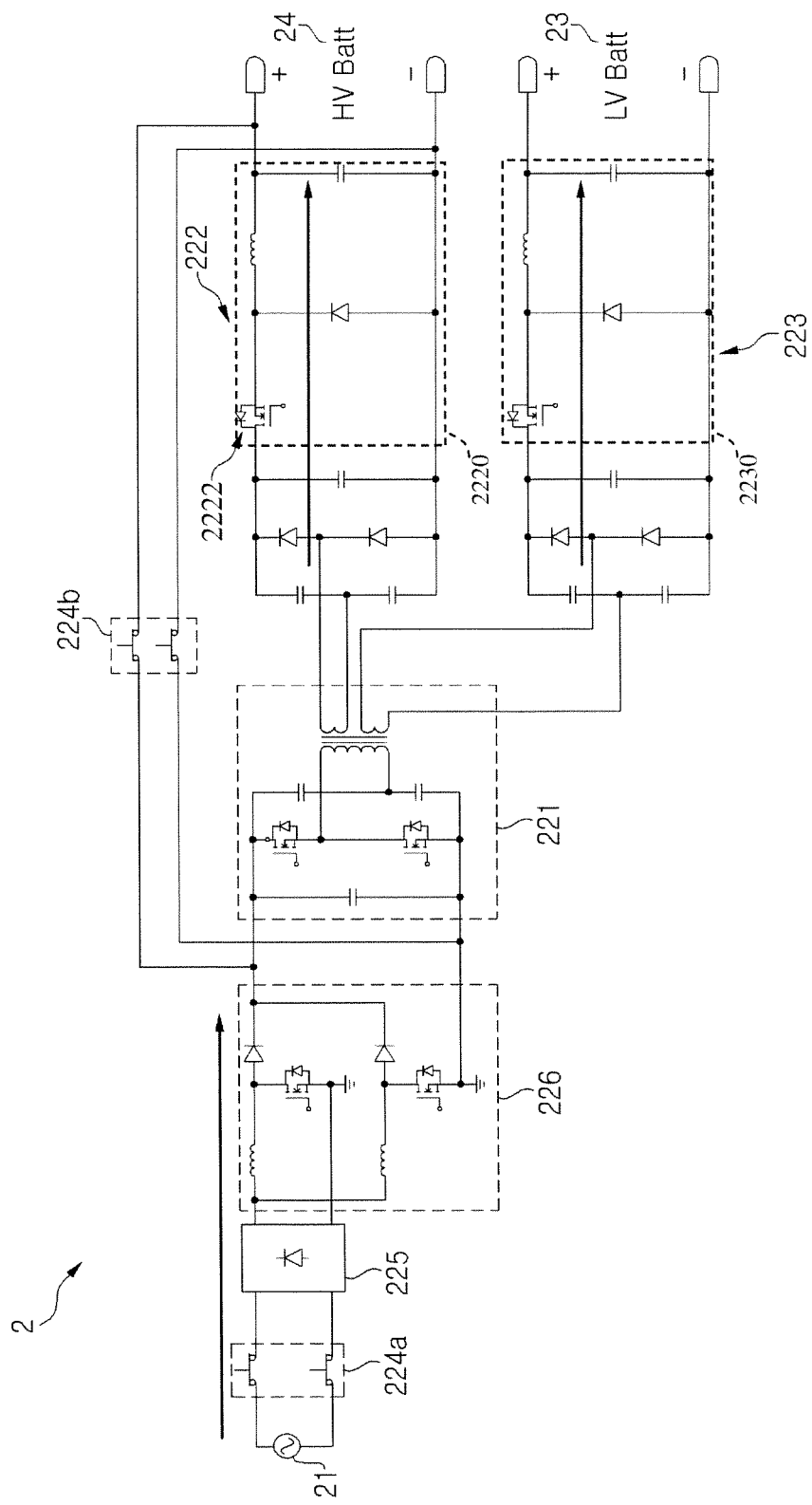
FIG. 3 is a detailed circuit diagram of a battery charging apparatus according to an embodiment of the present invention.
Figure 4:
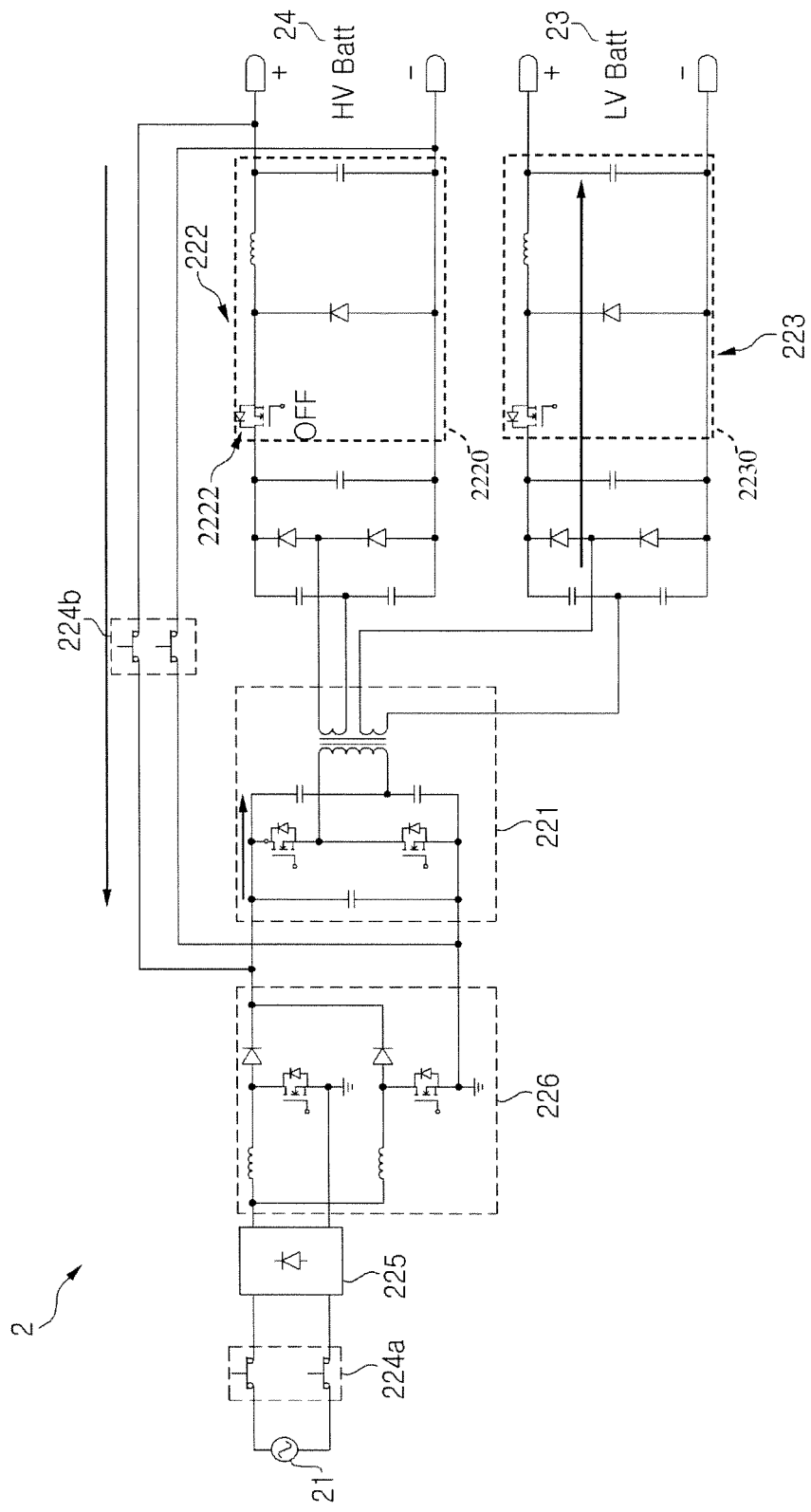
FIG. 4 is a detailed circuit diagram of a battery charging apparatus according to an embodiment of the present invention.

FIGS. 3 and 4 are detailed circuit diagrams of the battery charging apparatus according to the embodiment of the present invention.

Referring to FIGS. 3 and 4, the battery charging apparatus 2 may include a rectifying unit 225 configured to perform a rectification operation to convert an AC power 21 into a DC voltage, a power factor correction (PFC) circuit 226 configured to correct a power factor of the DC voltage, a hybrid power converting unit 221, a high voltage charging unit 222, an auxiliary voltage charging unit 223, and a switching unit 224. The battery charging apparatus 2 may further include an electromagnetic interference (EMI) filter at a front end of the rectifying unit 225, a current control circuit, and a voltage control circuit.

The rectifying unit 225 rectifies the AC power 21 and outputs the DC voltage.

The PFC circuit 226 corrects a power factor of the DC voltage output from the rectifying unit 225 and supplies the power-factor-corrected DC voltage to the hybrid power converting unit 221. The PFC circuit 226 may use an interleaved boost converter. The interleaved boost converter is a step-up converter in which an input terminal and an output terminal share the same ground. In the interleaved boost converter, when a switch is in an ON state, input power is connected to both terminals of an inductor so that a current is charged. On the other hand, when the switch is switched to an OFF state, the charged current is transferred to a filter of a load side. In the interleaved boost converter, when looking from the filter of the load side, the current is periodically flowed thereinto and interrupted. A current flowing through the output terminal is always smaller than a current flowing through the input terminal. Due to the principle of a circuit operation, there are no loss components. Therefore, from the relationship of "input current×input voltage=output current×output voltage", the output voltage is always higher than the input voltage. When a duty ratio (D) is defined as "switch-on duration/switching period", the output voltage (Vo) is expressed as $Vo=Vi/(1-D)$. The output voltage of the PFC circuit 226 may be, for example, DC 380 V. Meanwhile, in the drawings, the PFC circuit 226 may employ a parallel structure when configuring the interleaved boost converter. Therefore, even though one circuit is damaged, the PFC circuit 226 may be operated by the other circuit, ensuring the reliability of the circuit.

The hybrid power converting unit 221 includes a common transformer. The hybrid power converting unit 221 uses the common transformer to separately convert the AC power 21 into a first voltage and a second voltage for charging the high voltage battery 24 and the auxiliary battery 23. For example, the first voltage may be DC 500 V, and the second voltage may be 100 V. The transformer may be commonly used for the power conversion into the first voltage and the second voltage for the high voltage charging unit 222 and the auxiliary voltage charging unit 223. The transformer has secondary windings having turns ratios corresponding to the power conversion for the high voltage charging unit 222 and the auxiliary voltage charging unit 223.

The high voltage charging unit 222 and the auxiliary voltage charging unit 223 may use step-down converters. For example, the high voltage charging unit 222 and the auxiliary voltage charging unit 223 may use interleaved buck converters 2220 and 2230. The buck converter is used for a circuit in which an input terminal and an output terminal share the same ground. The high voltage charging unit 222 and the auxiliary voltage charging unit 223 use switching elements 2222 that perform a switching operation (repeat an ON/OFF operation) at a constant period, such that the input power is connected to the circuit when the switching element 2222 is in an ON state, and the input power is disconnected from the circuit when the switching element 2222 is in an OFF state. The high voltage charging unit 222 and the auxiliary voltage charging unit 223 output the DC voltages by using an LC filter to smooth (average) a pulse voltage that is periodically connected to and disconnected from the circuit.

The buck converter may basically employ a principle that generates the output voltage by averaging the pulse voltage produced by periodically chopping the DC voltage. Such a converter is called a voltage-fed converter, and the output voltage is always lower than the input voltage. As the switch-on duration of the switch in one period is longer, the width of the pulse voltage is further widened. As the switch-on duration of the switch in one period is shorter, the width of the pulse voltage is further narrowed. When a duty ratio (D) is defined as "switch-on duration/switching period", the output voltage (Vo) becomes Vo=D×Vi.

The high voltage charging unit 222 drops the first voltage (500 V) output from the hybrid power converting unit 221 to a voltage of, for example, 200 to 450 V, and then charges the high voltage battery 24 with the dropped first voltage. On the other hand, the auxiliary voltage charging unit 223 drops the second voltage (100 V) output from the hybrid power converting unit 221 to a voltage of, for example, 12 to 14 V, and then charges the auxiliary battery 23 with the dropped second voltage.

As such, an amount of current can be reduced by setting the output voltage of the PFC circuit 226 to 380 V and setting the first voltage output from the hybrid power converting unit 221 to a high voltage of 500V. Also, the size of passive elements can be reduced and heat dispersion can be maximized by configuring the PFC circuit 226, the high voltage charging unit 222, and the auxiliary voltage charging unit 223 with the interleaved buck converters.

A first switching unit 224a configured to switch the supply or interrupt of the AC power 21 may be installed at an input terminal of the rectifying unit 225. The first switching unit 224a may switch the electrical connection between the AC power 21 and the auxiliary voltage charging unit 223, such that the second voltage output from the hybrid power converting unit 221 or the voltage of the high voltage battery 24 is selectively input to the auxiliary voltage charging unit 223.

On the other hand, a second switching unit 224b configured to switch the electrical connection between the high voltage battery 24 and the auxiliary voltage charging unit 223 may be installed. The second switching unit 224b is installed between both terminals of the high voltage battery 24 and both terminals of a primary winding of the transformer provided in the hybrid power converting unit 221.

The first switching unit 224a and the second switching unit 224b may perform a switching operation for a first mode and a second mode. In the first mode, the charging of the high voltage battery 24 and the charging of the auxiliary battery 23 by the AC power 21 may be performed by the switching operation of the first switching unit 224a and the second switching unit 224b. In the second mode, the charging of the high voltage battery 24 by the AC power may be stopped and the charging of the auxiliary battery 23 by the voltage of the high voltage battery 24 may be performed by the switching operation of the first switching unit 224a and the second switching unit 224b.

In this case, in the first mode, the first switching unit 224a may be switched to an ON state and the second switching unit 224b may be switched to an OFF state. On the other hand, in the second mode, the first switching unit 224a may be switched to an OFF state and the second switching unit 224b may be switched to an ON state.

In such a configuration, the first mode operation of charging the high voltage battery 24 and the auxiliary battery 23 by the AC power 21 will be described below with reference to FIG. 3.

The OBC 22 receives an instruction to charge the high voltage battery 24 and the auxiliary battery 23 from the BMS (not illustrated). Accordingly, as illustrated in FIG. 3, the first switching unit 224a and the second switching unit 224b may perform a switching operation such that the AC power 21 is input to the hybrid power converting unit 221.

In the first mode, the first switching unit 224a is switched to an ON state and the second switching unit 224b is switched to an OFF state. Accordingly, the AC power 21 is input to the hybrid power converting unit 221 through the rectifying unit 225 and the PFC circuit 226. The hybrid power converting unit 221 converts the AC power 21 into the first voltage and outputs the first voltage to the high voltage charging unit 222. The high voltage charging unit 222 drops the first voltage and charges the high voltage battery 24 with the dropped first voltage. Meanwhile, the hybrid power converting unit 221 converts the AC power 21 into the second voltage and outputs the second voltage to the auxiliary voltage charging unit 223. The auxiliary voltage charging unit 223 drops the second voltage and charges the auxiliary battery 23 with the dropped second voltage.

Meanwhile, the second mode operation of charging the auxiliary battery 23 by the high voltage battery 24 will be described below with reference to FIG. 4.

The OBC 22 receives an instruction to charge the auxiliary battery 23 from the BMS (not illustrated). Accordingly, as illustrated in FIG. 4, the first switching unit 224a and the second switching unit 224b perform a switching operation such that the input of the AC power 21 to the hybrid power converting unit 221, the high voltage charging unit 222, and the auxiliary voltage charging unit 223 is interrupted, and the power of the high voltage battery 2 is input to the auxiliary voltage charging unit 223.

In the second mode, the first switching unit 224a is switched to an OFF state and the second switching unit 224b is switched to an ON state. Accordingly, the OFF operation of the first switching unit 224a interrupts the supply of the AC power 21 to the rectifying unit 225, the PFC circuit 226, and the hybrid power converting unit 221. Therefore, the hybrid power converting unit 221 cannot perform the power conversion of the AC power 21 into the first voltage or the second voltage. Thus, since the first voltage cannot be output to the high voltage charging unit 222 any more, the high voltage charging unit 222 cannot perform the operation of dropping the first voltage and charging the high Voltage battery 24 with the dropped first voltage. Meanwhile, the hybrid power converting unit 221 also cannot output the second voltage generated by the power conversion of the AC power 21 to the auxiliary voltage charging unit 223.

However, since the second switching unit 224b is in the ON state, the voltage of the high voltage battery 24 is transferred to the input terminal of the hybrid power converting unit 221 through the second switching unit 224b. The voltage of the high voltage battery 24, which is transferred to the input terminal of the hybrid power converting unit 221, is induced in the secondary windings of the transformer provided in the hybrid power converting unit 221. In this case, the secondary windings of the transformer may include a secondary winding connected to the high voltage charging unit 222 and a secondary winding connected to the auxiliary voltage charging unit 223. Meanwhile, in the second mode, the switching element 2222 of the high voltage charging unit 222 is set to maintain the OFF state. Therefore, the voltage of the high voltage battery 24 is induced not in the secondary winding connected to the high voltage charging unit 222 but in the secondary winding connected to the auxiliary voltage charging unit 223. The auxiliary voltage charging unit 223 drops the voltage of the high voltage battery 24, which is induced in the secondary winding, and charges the auxiliary battery 23 with the dropped voltage.

Figure 5:
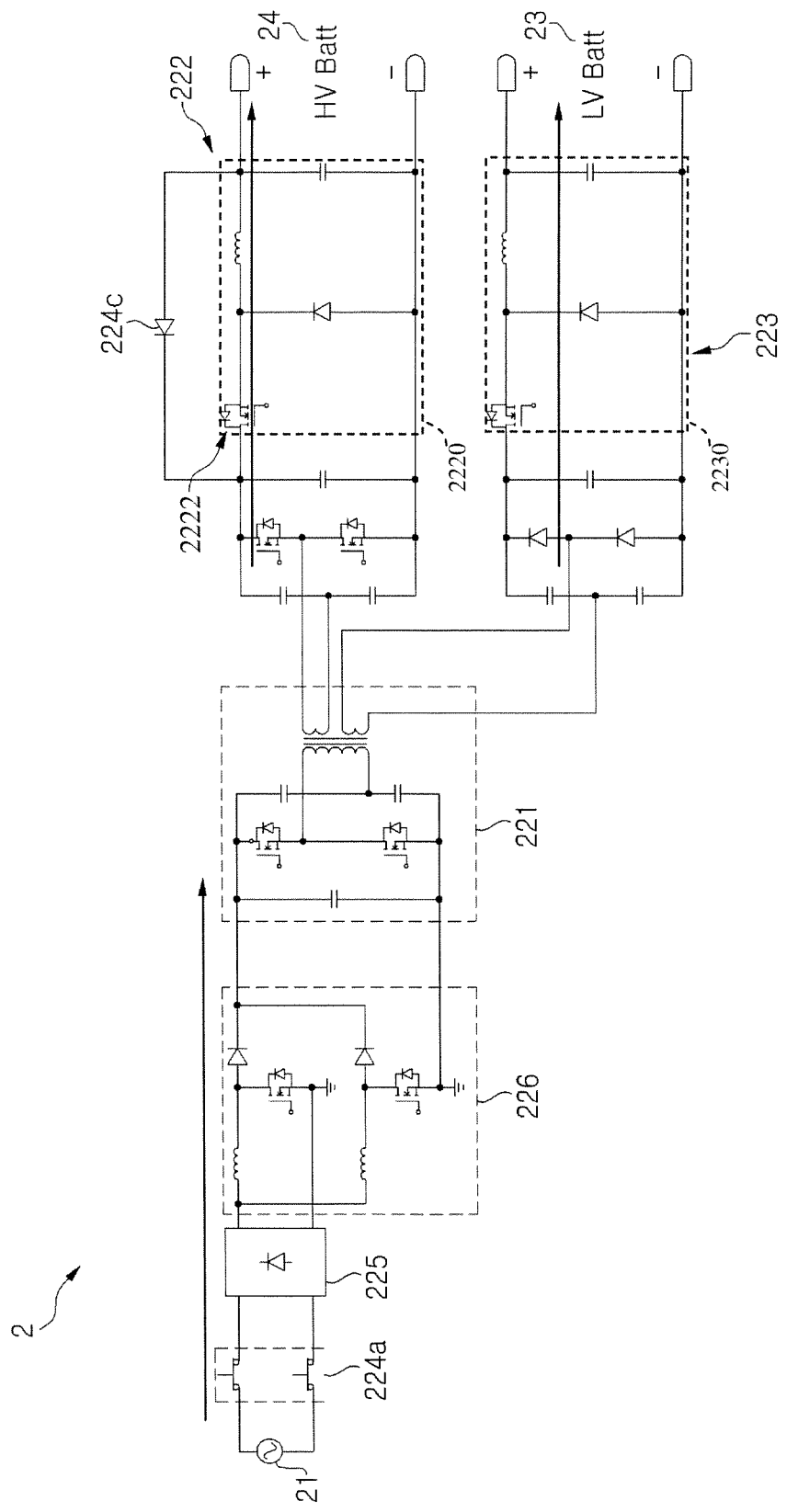
FIG. 5 is a detailed circuit diagram of a battery charging apparatus according to another embodiment of the present invention.
Figure 6:
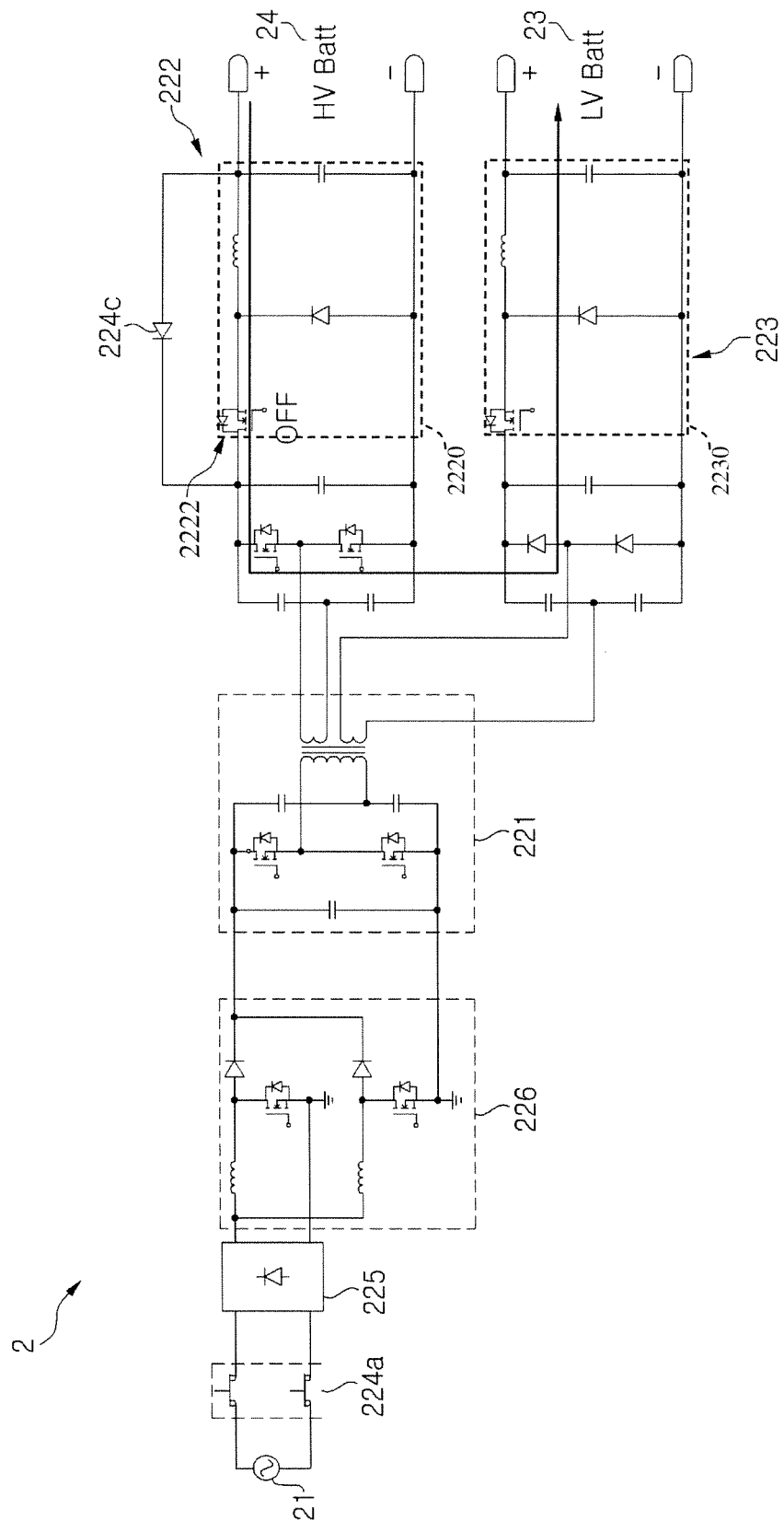
FIG. 6 is a detailed circuit diagram of a battery charging apparatus according to another embodiment of the present invention.

FIGS. 5 and 6 are detailed circuit diagrams of a battery charging apparatus according to another embodiment of the present invention.

Referring to FIGS. 5 and 6, a battery charging apparatus 2 according to another embodiment of the present invention may include a rectifying unit 225 configured to perform a rectification operation to convert an AC power 21 into a DC voltage, a PFC circuit 226 configured to correct a power factor of the DC voltage, a hybrid power converting unit 221, a high voltage charging unit 222, an auxiliary voltage charging unit 223, and a switching unit 224. The battery charging apparatus 2 may further include an EMI filter at a front end of the rectifying unit 225, a current control circuit, and a voltage control circuit.

The rectifying unit 225 rectifies the AC power 21 and outputs the DC voltage. The PFC circuit 226 corrects a power factor of the DC voltage output from the rectifying unit 225 and supplies the power-factor-corrected DC voltage to the hybrid power converting unit 221. The PFC circuit 226 may use an interleaved boost converter. The interleaved boost converter is a step-up converter in which an input terminal and an output terminal share the same ground. In the interleaved boost converter, when a switch is in an ON state, input power is connected to both terminals of an inductor so that a current is charged. On the other hand, when the switch is switched to an OFF state, the charged current is transferred to a filter of a load side. In the interleaved boost converter, when looking from the filter of the load side, the current is periodically flowed thereinto and interrupted. A current flowing through the output terminal is always smaller than a current flowing through the input terminal. Due to the principle of a circuit operation, there are no loss components. Therefore, from the relationship of "input current×input voltage=output current× output voltage", the output voltage is always higher than the input voltage. When a duty ratio (D) is defined as "switch-on duration/switching period", the output voltage (Vo) is expressed as $Vo=Vi/(1-D)$. The output voltage of the PFC circuit 226 may be, for example, DC 380 V.

The hybrid power converting unit 221 includes a common transformer. The hybrid power converting unit 221 uses the common transformer to separately convert the AC power 21 into a first voltage and a second voltage for charging the high voltage battery 24 and the auxiliary battery 23. For example, the first voltage may be DC 500 V, and the second voltage may be 200 to 450 V. The transformer may be commonly used for the power conversion into the first voltage and the second voltage for the high voltage charging unit 222 and the auxiliary voltage charging unit 223. The transformer has secondary windings having turns ratios corresponding to the power conversion for the high voltage charging unit 222 and the auxiliary voltage charging unit 223.

The high voltage charging unit 222 and the auxiliary voltage charging unit 223 may use step-down converters. For example, the high voltage charging unit 222 and the auxiliary voltage charging unit 223 may use buck converters. The buck converter is used for a circuit in which an input terminal and an output terminal share the same ground. The high voltage charging unit 222 and the auxiliary voltage charging unit 223 use switching elements 2222 that perform a switching operation (repeat an On/OFF operation) at a constant period, such that the input power is connected to the circuit while the switching elements 22a are in an ON state, and the input power is disconnected from the circuit while the switching elements 22a are in an OFF state. The high voltage charging unit 222 and the auxiliary voltage charging unit 223 output the DC voltages by using an LC filter to smooth (average) the pulse voltage that is periodically connected to and disconnected from the circuit.

The buck converter may basically employ a principle that generates the output voltage by averaging the pulse voltage produced by periodically chopping the DC voltage. Such a converter is called a voltage-fed converter, and the output voltage is always lower than the input voltage. As the switch-on duration of the switch in one period is longer, the width of the pulse voltage is further widened. As the switch-on duration of the switch in one period is shorter, the width of the pulse voltage is further narrowed. When a duty ratio (D) is defined as "switch-on duration/switching period", the output voltage (Vo) becomes $Vo=D \times Vi$.

The high voltage charging unit 222 drops the first voltage (500 V) output from the hybrid power converting unit 221 to a voltage of, for example, 200 to 450 V, and then charges the high voltage battery 24 with the dropped first voltage. On the other hand, the auxiliary voltage charging unit 223 drops the second voltage (100 V) output from the hybrid power converting unit 221 to a voltage of, for example, 12 to 14 V, and then charges the auxiliary battery 23 with the dropped second voltage.

A first switching unit 224a configured to switch the supply or interrupt of the AC power 21 may be installed at an input terminal of the rectifying unit 225. The first switching unit 224a may switch the electrical connection between the AC power 21 and the auxiliary voltage charging unit 223, such that the second voltage output from the hybrid power converting unit 221 or the voltage of the high voltage battery 24 is selectively input to the auxiliary voltage charging unit 223.

On the other hand, a second switching unit 224c configured to switch the electrical connection between the high voltage battery 24 and the auxiliary voltage charging unit 223 may be installed. The second switching unit 224c may include a diode connected in a forward direction between a positive terminal of the high voltage battery 24 and a secondary winding of a transformer.

The first switching unit 224a and the second switching unit 224c may perform a switching operation for a first mode and a second mode. In the first mode, the charging of the high voltage battery 24 and the charging of the auxiliary battery 23 by the AC power 21 may be performed by the switching operation of the first switching unit 224a and the second switching unit 224c. In the second mode, the charging of the high voltage battery 24 by the AC power may be stopped and the charging of the auxiliary battery 23 by the voltage of the high voltage battery 24 may be performed by the switching operation of the first switching unit 224a and the second switching unit 224c.

In this case, in the first mode, the first switching unit 224a is switched to an ON state and the second switching unit 224c maintains an OFF state. On the other hand, in the second mode, the first switching unit 224a is switched to an OFF state and the second switching unit 224c maintains an ON state.

In such a configuration, the first mode operation of charging the high voltage battery 24 and the auxiliary battery 23 by the AC power 21 will be described below with reference to FIG. 5.

The OBC 22 receives an instruction to charge the high voltage battery 24 and the auxiliary battery 23 from the BMS (not illustrated). Accordingly, as illustrated in FIG. 5, the first switching unit 224*a* and the second switching unit 224*c* may perform a switching operation such that the AC power 21 is input to the hybrid power converting unit 221.

In the first mode, the first switching unit 224*a* is switched to an ON state and the second switching unit 224*c* maintains an OFF state. Accordingly, the AC power 21 is input to the hybrid power converting unit 221 through the rectifying unit 225 and the PFC circuit 226. The hybrid power converting unit 221 converts the AC power 21 into the first voltage and outputs the first voltage to the high voltage charging unit 222. The high voltage charging unit 222 drops the first voltage and charges the high voltage battery 24 with the dropped first voltage. Meanwhile, the hybrid power converting unit 221 converts the AC power 21 into the second voltage and outputs the second voltage to the auxiliary voltage charging unit 223. The auxiliary voltage charging unit 223 drops the second voltage and charges the auxiliary battery 23 with the dropped second voltage.

Meanwhile, the second mode operation of charging the auxiliary battery 23 by the high voltage battery 24 will be described below with reference to FIG. 6.

The OBC 22 receives an instruction to charge the auxiliary battery 23 from the BMS (not illustrated). Accordingly, as illustrated in FIG. 6, the first switching unit 224*a* and the second switching unit 224*c* perform a switching operation such that the input of the AC power 21 to the hybrid power converting unit 221, the high voltage charging unit 222, and the auxiliary voltage charging unit 223 is interrupted, and the power of the high voltage battery 2 is input to the auxiliary voltage charging unit 223.

In the second mode, the first switching unit 224*a* is switched to an OFF state and the second switching unit 224*c* is switched to an ON state. Accordingly, the OFF operation of the first switching unit 224*a* interrupts the supply of the AC power 21 to the rectifying unit 225, the PFC circuit 226, and the hybrid power converting unit 221. Therefore, the hybrid power converting unit 221 cannot perform the power conversion of the AC power 21 into the first voltage or the second voltage. Consequently, since the first voltage cannot be output to the high voltage charging unit 222 any more, the high voltage charging unit 222 cannot perform the operation of dropping the first voltage and charging the high voltage battery 24 with the dropped first voltage. Meanwhile, the hybrid power converting unit 221 also cannot output the second voltage generated by the power conversion of the AC power 21 to the auxiliary voltage charging unit 223.

However, since the second switching unit 224*c* is in the ON state, the voltage of the high voltage battery 24 is transferred to the secondary windings of the hybrid power converting unit 221 through the second switching unit 224*c*. The secondary windings of the transformer may include a secondary winding connected to the high voltage charging unit 222 and a secondary winding connected to the auxiliary voltage charging unit 223. In this case, the voltage of the high voltage battery 24 is transferred to the secondary winding connected to the high voltage charging unit 222. The voltage of the high voltage battery 24, which is transferred to the secondary winding of the high voltage charging unit 222, is induced in the secondary winding connected to the auxiliary voltage charging unit 223.

Meanwhile, in the second mode, the switching element 2222 of the high voltage charging unit 222 is set to maintain an OFF state. Accordingly, the voltage of the high voltage battery 24 does not flow through the secondary winding connected to the high voltage charging unit 222, and the voltage of the high voltage battery 24 is induced in the secondary winding connected to the auxiliary voltage charging unit 223. The auxiliary voltage charging unit 223 drops the voltage of the high voltage battery 24, which is induced in the secondary winding, and charges the auxiliary battery 23 with the dropped voltage.

According to the present invention, during the charging of the high voltage battery by the AC power, the auxiliary battery also can be charged by commonly using the power conversion structure capable of transferring different power to the OBC through the transformer having different turns ratios.

Furthermore, according to the embodiments of the present invention, it is unnecessary to provide a separate LDC for charging the auxiliary battery. Since the charging of the auxiliary battery is performed together during the operation of charging the high voltage battery by the AC power. Therefore, the charging time can be reduced, and the power transmission efficiency can be improved. Consequently, it is possible to prevent the lifespan of the high voltage battery from being shortened.

Moreover, according to the present invention, an amount of current may be reduced by setting the output voltage of the PFC circuit and the first voltage output from the hybrid power converting unit to a high voltage. The size of passive elements can be reduced and heat dispersion can be maximized by configuring the PFC circuit, the high voltage charging unit, and the auxiliary voltage charging unit with the interleaved buck converters.

While the embodiments of the present invention has been described with reference to the specific embodiments, it will be apparent to those skilled in the art that various changes and modifications may be made without departing from the spirit and scope of the invention as defined in the following claims.

What is claimed is:

1. A battery charging apparatus comprising:
   a hybrid power converting unit using a common transformer to separately convert AC power into a first voltage and a second voltage for charging a high voltage battery and an auxiliary battery;
   a high voltage charging unit dropping the first voltage output from the hybrid power converting unit and charging the high voltage battery with the dropped first voltage;
   an auxiliary voltage charging unit dropping the second voltage output from the hybrid power converting unit or a voltage of the high voltage battery, and charging the auxiliary battery with the dropped second voltage or the dropped voltage of the high voltage battery; and
   a switching unit switching an electrical connection between the AC power and the auxiliary voltage charging unit and switching an electrical connection between the high voltage battery and the auxiliary voltage charging unit, such that the second voltage generated by the conversion of the AC power or the voltage of the high voltage battery is selectively input to the auxiliary voltage charging unit,
   wherein:
   in a first mode, the charging of the high voltage battery and the charging of the auxiliary battery by the AC power are performed by the switching operation of the switching unit, and in a second mode, the charging of the high voltage battery by the AC power is stopped and the charging of the auxiliary battery by the voltage of the high voltage battery is performed by the switching operation of the switching unit, the switching unit comprises a first switching unit switching the supply or interrupt of the AC power, and a second switching unit, installed between both terminals of the high voltage battery and both terminals of a primary winding of the common transformer, switching the transfer of the voltage of the high voltage battery to the auxiliary voltage charging unit, in the first mode, the first switching unit is switched to an ON state and the second switching unit is switched to an OFF state, and in the second mode, the first switching unit is switched to an OFF state and the second switching unit is switched to an ON state, and the common transformer includes the primary winding and first and second secondary windings having different turns ratios for the power conversion into the first voltage and the second voltage, the both terminals of the primary winding being electrically connected to the AC power, both terminals of the first secondary winding being electrically connected to the both terminals of the high voltage battery, and both terminals of the second secondary winding being electrically connected to both terminals of the auxiliary battery.

2. The battery charging apparatus according to claim 1, wherein the hybrid power converting unit, the high voltage charging unit, the auxiliary voltage charging unit, and the switching unit are mounted on an on board charger (OBC).

3. The battery charging apparatus according to claim 1, wherein, in the second mode, the switching unit performs a switching operation to transfer the voltage of the high voltage battery to an input terminal of the primary winding of the common transformer, such that the auxiliary voltage charging unit charges the auxiliary battery with the voltage of the high voltage battery.

4. The battery charging apparatus according to claim 1, wherein, in the second mode, the switching unit performs a switching operation to transfer the voltage of the high voltage battery to the second secondary winding of the common transformer, such that the auxiliary voltage charging unit charges the auxiliary battery with the voltage of the high voltage battery.

5. The battery charging apparatus according to claim 1, wherein
the second switching unit transfers the voltage of the high voltage battery to an input terminal of the primary winding of the common transformer.

6. The battery charging apparatus according to claim 1, wherein the second switching unit comprises a diode connected in a forward direction between a positive terminal of the high voltage battery and the first secondary winding connected to the high voltage charging unit.

7. The battery charging apparatus according to claim 1, further comprising:
a rectifying unit performing a rectification operation to convert the AC power into a DC voltage; and
a power factor correction (PFC) circuit correcting a power factor of the DC voltage and transfer the power-factor-corrected DC voltage to the hybrid power converting unit.

* * * * *